(12) United States Patent
Gangemi et al.

(10) Patent No.: US 9,003,416 B2
(45) Date of Patent: Apr. 7, 2015

(54) PREDICTING RESOURCE REQUIREMENTS FOR A COMPUTER APPLICATION

(75) Inventors: Rosario Gangemi, Rome (IT); Vincenzo Sciacca, Rome (IT); Massimo Villani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 13/228,537

(22) Filed: Sep. 9, 2011

(65) Prior Publication Data

US 2012/0079497 A1 Mar. 29, 2012

(30) Foreign Application Priority Data

Sep. 30, 2010 (EP) .................................. 10183139.4

(51) Int. Cl.
*G06F 9/46* (2006.01)
*G06F 9/50* (2006.01)

(52) U.S. Cl.
CPC ...... *G06F 9/5011* (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 5,704,012 A | 12/1997 | Bigus | |
| 6,237,114 B1 | 5/2001 | Wookey et al. | |
| 6,308,163 B1 | 10/2001 | Du et al. | |
| 6,810,495 B2 | 10/2004 | Castelli et al. | |
| 7,440,883 B2 | 10/2008 | Hardwick et al. | |
| 7,552,438 B1 * | 6/2009 | Werme et al. | 718/104 |
| 7,617,498 B1 * | 11/2009 | Lumsden | 718/104 |
| 2002/0161566 A1 * | 10/2002 | Uysal et al. | 703/21 |
| 2003/0009769 A1 * | 1/2003 | Hensgen et al. | 725/131 |
| 2003/0191829 A1 * | 10/2003 | Masters et al. | 709/223 |
| 2003/0233600 A1 * | 12/2003 | Hartman et al. | 714/32 |

(Continued)

FOREIGN PATENT DOCUMENTS

WO WO2007/033922 A2 3/2007

OTHER PUBLICATIONS

Manoel, Edson et al., "Problem Determination Using Self-Managing Autonomic Technology", IBM Corporation, Redbooks, http://www.redbooks.ibm.com/redbooks/pdfs/sg246665.pdf, Jun. 2005, pp. 3-21.

(Continued)

*Primary Examiner* — Camquy Truong
*Assistant Examiner* — Mehran Kamran
(74) *Attorney, Agent, or Firm* — Francis Lammes; Stephen J. Walder, Jr.; Parashos T. Kalaitzis

(57) ABSTRACT

A resource consumption model is created for a software application, making it possible to predict the resource requirements of the application in different states. The model has a structure corresponding to that of the application itself, and is interpreted to some degree in parallel with the application, but each part of the model is interpreted in less time than it takes to complete the corresponding part of the application, so that resource requirement predictions are available in advance. The model may be interpreted in a look-ahead mode, wherein different possible branches of the model are interpreted so as to obtain resource requirement predictions for the application after completion of the present step. The model may be derived automatically from the application at design or compilation, and populated by measuring the requirements of the application in response to test scenarios in a controlled environment.

16 Claims, 10 Drawing Sheets

(56) References Cited

U.S. PATENT DOCUMENTS

| | | | |
|---|---|---|---|
| 2004/0167959 A1* | 8/2004 | Doyle et al. | 709/203 |
| 2005/0010924 A1* | 1/2005 | Hipp et al. | 718/104 |
| 2005/0055350 A1* | 3/2005 | Werme et al. | 707/10 |
| 2005/0149940 A1* | 7/2005 | Calinescu et al. | 718/104 |
| 2005/0192969 A1 | 9/2005 | Haga et al. | |
| 2006/0013229 A1* | 1/2006 | Johansson et al. | 370/395.41 |
| 2006/0047478 A1 | 3/2006 | Di Palma et al. | |
| 2007/0005330 A9* | 1/2007 | Hardwick et al. | 703/22 |
| 2008/0086731 A1* | 4/2008 | Trossman et al. | 718/100 |
| 2008/0244576 A1* | 10/2008 | Kwon et al. | 718/1 |
| 2008/0255908 A1 | 10/2008 | Smith et al. | |
| 2009/0019440 A1* | 1/2009 | Ando | 718/100 |
| 2010/0050152 A1* | 2/2010 | Gilboa | 717/106 |
| 2010/0083248 A1* | 4/2010 | Wood et al. | 718/1 |
| 2011/0214129 A1* | 9/2011 | Litovtchenko et al. | 718/104 |
| 2012/0030646 A1* | 2/2012 | Ravindran et al. | 717/105 |
| 2012/0030647 A1 | 2/2012 | Wang et al. | |
| 2012/0042076 A1* | 2/2012 | Kawa et al. | 709/226 |

OTHER PUBLICATIONS

Zhang, Jian et al., "Application Resource Demand Phase Analysis and Prediction in Support of Dynamic Resource Provisioning", IEEE Fourth International Conference on Autonomic Computing (ICAC'07), downloaded on Nov. 23, 2008, 2 pages.

U.S. Appl. No. 13/673,109.

* cited by examiner

PREDICTING RESOURCE REQUIREMENTS FOR A COMPUTER APPLICATION

BACKGROUND

The present invention relates to mechanisms for predicting resource requirements for a computer application.

In the context of enterprise software applications the accounting and controlling of computing resources is extremely important, for both costs and power consumption control and service level agreement assurance.

One established solution exists in the context of virtualized computing environments, usually the backbone of computing clusters and Cloud environment, where a hypervisor mediates between hardware resources and operating systems resources made available to applications.

Recent middleware such as IBM WebSphere XD, beyond the concept of computing clusters, includes capabilities to respond to changes in load of input requests by migrating on demand hosted applications on processing nodes according to centralized management policies of different server farms, resulting in optimization of the overall computing power used.

Computing resources usage policies can be defined "manually" by the system administrator according to known application specific needs based on the experience of previous runs: an example of policy is to assign a certain node to a certain application during a fixed number of hours based on calendar time.

An experimental alternative approach includes Autonomic principles applied to both Operating Systems or Application Servers which by means of automation rules is able to decide when it is convenient to allocate new resources to running applications, for example just in time to migrate to new nodes or apply compensation actions.

The architecture of both hypervisors and Autonomic environments includes a resource allocation module that mediates the interaction of software application code and system resources.

If an operating environment has available (for example from a resource allocation module as described above) predictions of the future state (absolute amount requirement or relative percentage with respect to some actual value) of its computing resources it might operate control actions for crash prevention, application migration to other nodes or at least administrators notification or any other meaningful action, for example actions performed by an autonomic feedback engine.

There are two main prior art approaches to the described problem of predicting resources requirements: "monitoring" and "modeling and simulation".

Monitoring of Resource Consumption

The first is a "traditional monitoring" of resources and applications, for example as implemented in the IBM Tivoli Monitoring software product, aiming at measuring and analyzing in real-time consumption trends of individual resources (or correlated), comparing thresholds or more complex from historical data of known operating situations. There are known successes in literature and industry but often serious problems, such as resource exhaustion, which are detected too late for the Operating System or administrators to take recovery actions, or are not detected at all because the signals from historical monitoring data don't show patterns or the identified patterns don't exhibits prediction trends.

1. Advantages: standard and stable implementation and deployment.
2. Drawbacks: raw prediction capabilities.

Modeling (Parametric and Non-Parametric) of Resource Consumption

The second approach is system and applications modeling and simulation, in which case a mathematical model of the system, resources and of the running application is selected so that a simulation or analysis can predict the application behavior with respect to some modeled aspects. There exist many frameworks to derive parametric (or non parametric) models of software (both applications and systems) to evaluate and predict performance or computation complexity, noticeable examples are the QN (Queuing Networks) and QPN (Queuing Petri Networks), Markov Models and others (including combinations of different techniques).

1. Advantages: accuracy of simulations.
2. Drawbacks: resulting model usually strongly related to a particular application and to a particular aspect of interest like its performance or serviceability. This modeling approach makes it possible to increase or to decrease the complexity of the model to obtain better or worse predictions but it usually requires a deep human intervention in the definition of each different application model and its not aimed for runtime control and monitoring of applications but in the upfront study and optimization in the design phase, additionally its mathematical model might requires more computing resources that the application itself. Another modeling approach is the non parametric approach whereby based on a resource consumption analysis and prediction based of the evaluation of time series. Time series are known to be very difficult to correlate for prediction purposes without any information about the semantic of what is being performed on the system. Another problem is that the analysis of the mass of recordings of monitoring data required for every resource in every usage condition introduce itself a challenge.

SUMMARY

In one illustrative embodiment, a method is provided for predicting resource requirements for a computer application. The illustrative embodiment provides a resource consumption model of an application, the resource consumption model being adapted to provide the resource requirements of the application as a function of a status of the application. The illustrative embodiment executes the application. In parallel with the application execution, the illustrative embodiment interprets the resource consumption model in conjunction with the state of application to generate resource requirement data for the application. The illustrative embodiment adjusts system resource settings affecting the application as a function of the resource requirement data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

Further advantages of the present invention will become clear to the skilled person upon examination of the drawings and detailed description. It is intended that any additional advantages be incorporating therein.

BRIEF DESCRIPTION OF THE SEVERAL VIEWS OF THE DRAWINGS

Embodiments of the present invention will now be described by way of example with reference to the accompanying drawings in which like references denote similar elements, and in which:

FIG. 5b shows some details of functional architecture of FIG. 5a;

DETAILED DESCRIPTION

Figure 1:
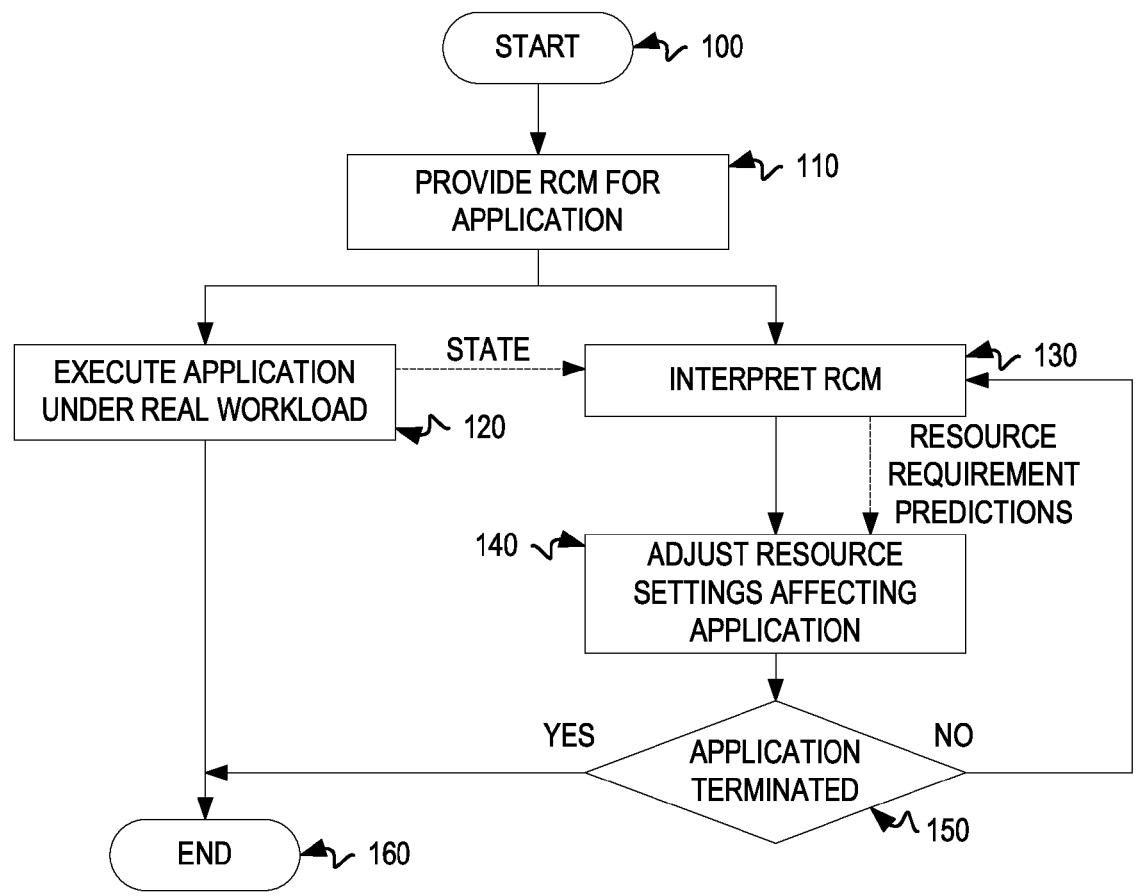
FIG. 1 shows a flowchart of the steps of a first embodiment.

Traditional monitoring allows the hosting system to inspect what an application is doing with the host system's own resources in an agnostic manner. In accordance with the approach described herein, the host system is informed in advance of the "boundaries" in which the application will move during execution. There is accordingly proposed a framework that extends the design and implementation of software applications to self document their resource consumption with the final objective of simplifying prediction of consumed resources by the hosting computing environment.

In accordance with certain embodiments, the application will be required to "publish" the manner in which it interacts with system resources, while the details will be explained in the implementation section, this step may be described as a kind of extension of the concept of "manifest" of J2EE applications.

In such advanced manifest, the developer or the designer would embed a model called Resources Consumption Model (RCM) structured in a fashion similar to a Unified Modeling Language (UML) artifact representing application architectures that describes the aspect of the application limited to the purpose of resource usage monitoring and prediction.

A Resource Consumption Model according to certain embodiments is a task-based model describing the application components and is derived from an Operational Architecture. It describes how components are interconnected and interact with each other by means of invoked interfaces. In detail during the development of software applications a model needs to be developed to represent particular aspects of its non-functional behavior. In the Operational Architecture the deployment unit may be an application artifact that is installed on a runtime environment, can be executed on that runtime and consumes resources on the runtime itself. The model represents a task based view of the application where each task is consistent with the purpose of resource utilization modeling: it could be derived at least combining information from sequence diagrams and deployment unit's topology, in a minimalist example a single sequence diagram running entirely inside a deployment unit could be a task. In this phase the "regions" of the application relevant for resource consumption accounting are identified by the designer or programmer but they can also start or rely entirely upon an automatic process that employs static analysis techniques on the software application code and diagrams. The application task-regions modeled inside the RCM are the Deployment Unit Model units.

Since the application and model structure are derived from the same application architecture, the structure of the model will be analogous to the structure of the application.

The structure of the model may thus mirror that of said application, and comprises a plurality of units, each unit corresponding to a particular combination of status conditions correspond to functional states of said application, and wherein said step of populating comprises associating one or more predefined statistical performance metrics with said state.

Indeed the model structure may be derived from a formal description of the application, or from the source code of the application itself.

FIG. 1 shows a flowchart of the steps of a first embodiment.

As shown in FIG. 1, the method starts at step 100, before proceeding to step 110, at which a resource consumption model (RCM) is provided for an application. The method then proceeds to both step 120 and 130 in parallel. At step 120, the application corresponding to the model is executed, and at the same time, at step 130 the model itself is interpreted. It will be appreciated that for the model to provide relevant resource requirement predictions, it is desirable for the model to be coordinated with the actual state of the application as reflected by the broken arrow between the boxes 120 and 130. In particular, the invocation of application interfaces between application modules and may be monitored by the hosting environment. To achieve this, a monitoring system may be provided for resource consumption accounting of application components. The application should preferably be instrumented in order to signal the task regions transitions for example by means of Application Response Measurement (ARM) technology, when instrumentation is not possible the same information could be gathered analyzing the application diagnostic traces properly configured or the application could be written to persist the information on external database table or file archives.

The application model read from application deployment units is re-assembled into a cumulative model and then run on a simulation server environment in parallel with the real application.

Preferably, the consumption model is "navigated" to provide a forecast of resources consumption based on sampled workload measurements from the real application by traditional monitoring technologies, as indicated by the broken arrow between steps 130 and 140.

The prediction module for each defined interface computes the forecast on resource consumption, each contribution is summed over interface and averaged over the time-frame of analysis for a task in the model.

Thus the interpretation of the model provides resource requirement predictions indicating the likely resource requirements of the application. From step 130 the method proceeds to step 140, at which system resource settings are adjusted as a function of the resource requirement predictions provided by the model, if necessary. The objective here may be to have the core systems working at 100% usage of resources and to deploy additional resources on-demand, so the proposal position itself is such scenarios allowing (possibly) anticipating the need of additional resources or the possibility to free them up for other application.

The method then proceeds to step 150 from which the method reverts to step 130 if the application is still running, thus the steps of interpreting 130 and adjusting 140 are repeated iteratively as the state of the application evolves. Otherwise the method terminates at step 160. The method proceeds from step 120 to termination at step 160 at the end of the application.

Accordingly, there is proposed a computing resource consumption prediction based on a kind of "predictive monitoring"

For the output of the model to have this predictive quality it is of course desirable that at the step of interpreting the resource consumption model, the interpretation of a unit of the model is completed in less time than that required for the completion of the corresponding functional state of said application, so that said resource requirement data are available before the application changes state.

In accordance with certain embodiments, every application operation module may contain a model fragment. According to certain embodiments, each such fragment may contain the following information:
  operational diagram of all the entire application,
  information of the specific module including:
    internal interfaces to monitor,
    model of resource behavior of the invocation of a certain interface for each operating system,
    resource context of the underlying system etc as detailed in the implementation part.

According to a preferred embodiment, the model of derived in part from measuring the behavior of the application under controlled conditions.

Accordingly there is provided a method of predicting resource requirements for a computer application said method comprising the steps of
providing a resource consumption model of said application, said model being adapted to provide of the resource requirements of said application as a function of the status of said application, executing the application, interpreting the resource consumption model in parallel with said application to generate resource requirement data for said application, and adjusting system resource settings affecting said application as a function of said data.

Figure 2:
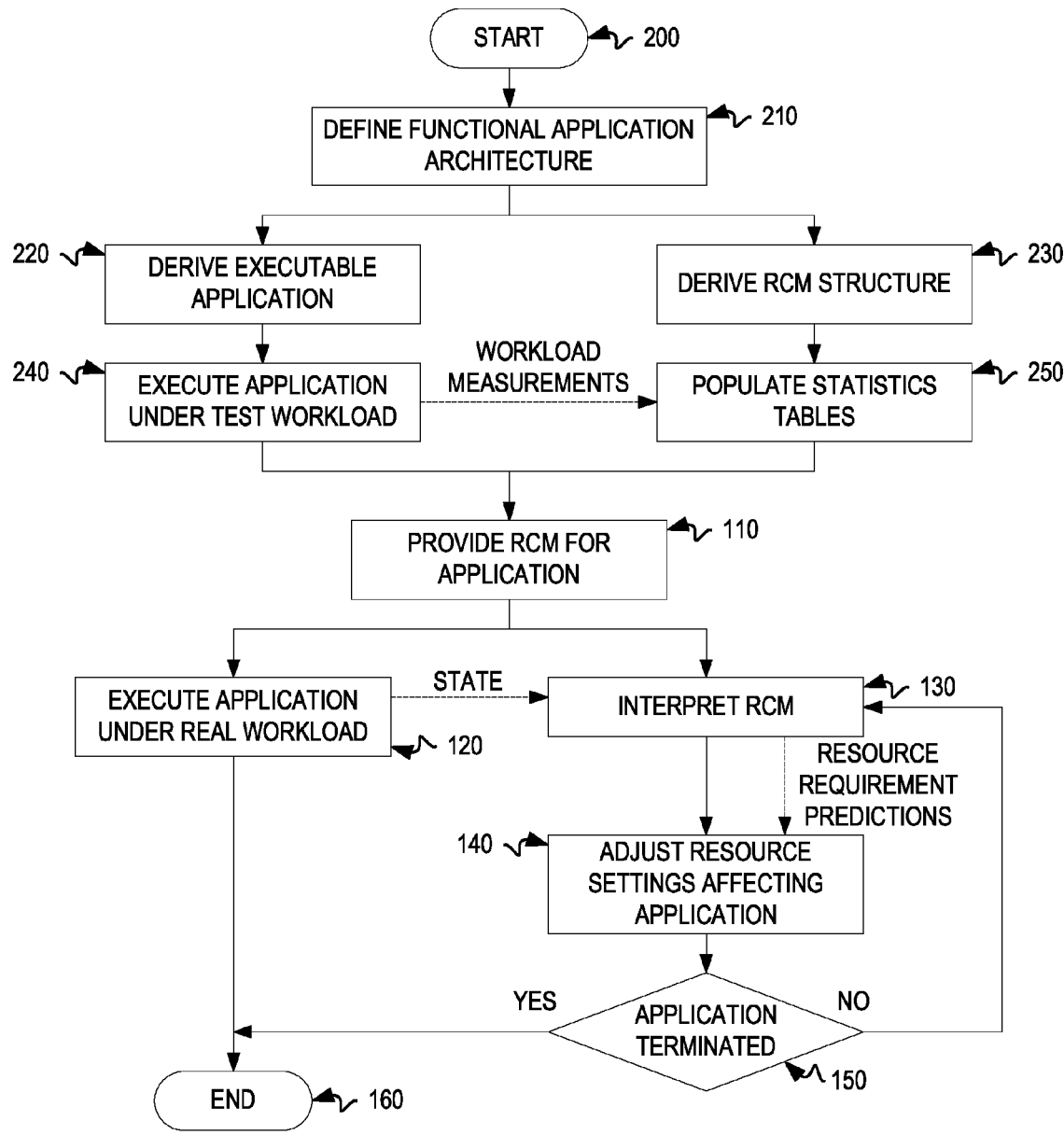
FIG. 2 shows a flowchart of the steps of a second embodiment.

FIG. 2 shows a flowchart of the steps of a second embodiment.

As shown in FIG. 2, the method starts at step 200, before proceeding to step 210, at which the functional application architecture is defined. This step will generally be a standard part of the process of the creation of a software application. The method then proceeds in parallel to steps 220 and 230. At step 220, an executable application is derived from the functional application architecture defined in the preceding step. The executable application may be derived to a greater or lesser extent by automatically processing the application architecture. Meanwhile at step 230, the Resource Consumption Model structure is defined, from the functional application architecture defined in step 210.

From step 220 the method proceeds to step 240 and in parallel from step 230 to 250. At step 240 the application is executed in controlled test conditions and subjected to a test workload. Workload measurements concerning the resource requirements of the application are extracted and used at step 250 to populate the statistics tables which constitute part of the model as indicated by the broken arrow between steps 24 and 250 and as described in more detail hereafter. By thoroughly testing the requirements of the application under a range of operating conditions, the model statistics tables can be populated so as to reflect the likely requirements of different parts of the application under different real world conditions, in normalized form. Resource consumption models are built in a training phase before the runtime production use. During application test phase the application is run several times by mean of test automation. Every time the application input load is varied according to simulated input load as for capacity planning tests and resources consumption is traced accordingly. During this testing/resource accounting phase of the application on the real regular test environment each task will be monitored with respect of its resource usage, typically memory, CPU, disk, network. In principle every resource of interest can be modeled and measured with a proper monitoring software available on the market as the IBM IT Monitoring.

Accordingly, the method of predicting resource requirements for a computer program may comprise the further steps of executing said computer program in a test environment so as to pass through a plurality of status conditions, measuring resource requirements of said application under said status conditions, and populating said model on the basis of the measured resource requirements.

The invocation of each interface in input to a model of Deployment Unit in RCM model is tracked and historical data about resources is recorded, Each individual functional test case that is identified can be also expanded according to a monte-carlo like procedure and effects of test case execution on resources are recorded as describe above. In this case a simulated execution environment can be leveraged like the K42, an experimental operating environment from IBM Research created for performance evaluations or hardware virtualization environments configured for the scope.

The outcome of that "training" phase is a tabular recording of how many units of a target resource is consumed when an application interface represented in the RCM is invoked. The recordings are then sampled for later efficient usage with a piece-wise linearization technique:

Each computing resource (CPU, disk, memory, network . . . ) prediction model inside a DUM is recorded as a finite set of points (stored as numbers representing coordinates in the consumption resources space) that represent the slope change points as identified from the piecewise linearization analysis of training phase historical data. The piecewise linear function that best represent the consumption curve of resource R will be used in subsequent steps for computationally effective modeling of non linear consumption curves (including approximations of exponential and sigmoid ones) that are observed in real IT systems: on the x axis there are the number of requests of a certain attributes (with effect on resource R) and on the y axis represent units of R consumed by that invocation.

According to certain embodiments the model structure may be defined in terms of a UML type description language, where the Interfaces of a Deployment Unit Model (DUM) plays the same role of Interfaces of application components and they can be associated to a particular parametric probabilistic distribution such as a Gaussian distribution with two parameters, the average value and its standard deviation, Poisson, exponential, uniform that specifies the load of the interface and to a set of resources it consumes.

The model may alternatively be represented by a directed graph with a set of meaning for some elements that can be translated into UML notation that is to be interpreted by a corresponding simulation engine.

In one practical example the invocation attribute is "page requests from portal" and the base average computed in the initial test phase is 100 but the monitoring reports that in a current timeframe the number of requests is on average 110 (still sticking with same predicted Gaussian distribution) then the value 110 is used as input for task resource consumption prediction from that point in time onward (on the simulations) and this change is then reflected by mean of inner dependencies of the RCM model along all the affected tasks adjusting the resource consumption predictions in all tasks.

The same classification purpose will be possible in at least another way: manually by the programmer or architect or even tester according to design or coding or testing considerations.

One the model is complete, the method proceeds to step 110, at which the application and corresponding model are distributed to an end user as described above. Naturally, the two components may be distributed independently. The method then proceeds in accordance with the steps described with respect to FIG. 1.

According to a preferred embodiment, invocations of application internal and external interfaces are monitored with available monitoring solutions such as IBM Tivoli Monitoring. Invocation of interfaces are monitored and analyzed: Monitoring results are aggregated and gathered (as described hereafter) in sampling timeframes and the results sent to a simulation server that is able to run the simulation model.

The aggregate measures are split again and sent into the equivalent application methods of the model, it's important to notice that the model does model non-functional aspects of the application and the invocation of a model interface method only trigger the reading of a predicted consumption of the component involved by the method according to a proper prediction model, for example based on linear piecewise prediction laws.

Thus, while in principle a sufficiently detailed model may be able to run for some time independently and remain synchronized with the application, preferably information from monitoring probes (i.e. the workload on interfaces) if available is used to update periodically the corresponding parameters in the models (that is: in the models we have an initial set of parameters): for example suppose if we have a Gaussian workload with Mean=11.5 and Standard Deviation=8 and for a monitoring interval of (say) 5 minutes we observe from the real application a Mean=11 and Standard Deviation=9 then we adapt the parameters of the model with statistical smoothing techniques to make it more representative. There exists statistical tests that can be run on the sample to validate the assumption about the distribution of the workload, that is we can found the assumption about the Gaussian to be false and invalidate the model, for example switching to a Uniform or other probability density function (pdf), according to a state of the art pdf estimator.

Comparison between the model condition and reality can be made subject to a metric to define a distance to be used as a quality indicator of the prediction, for example based on the square root of the sum of squares of the differences between the simulated and real measurement points.

Thus one or more interfaces of the application are monitored so as to determine application workload levels, and wherein workload values in said models are updated to reflect these measured values when available.

Figure 3:
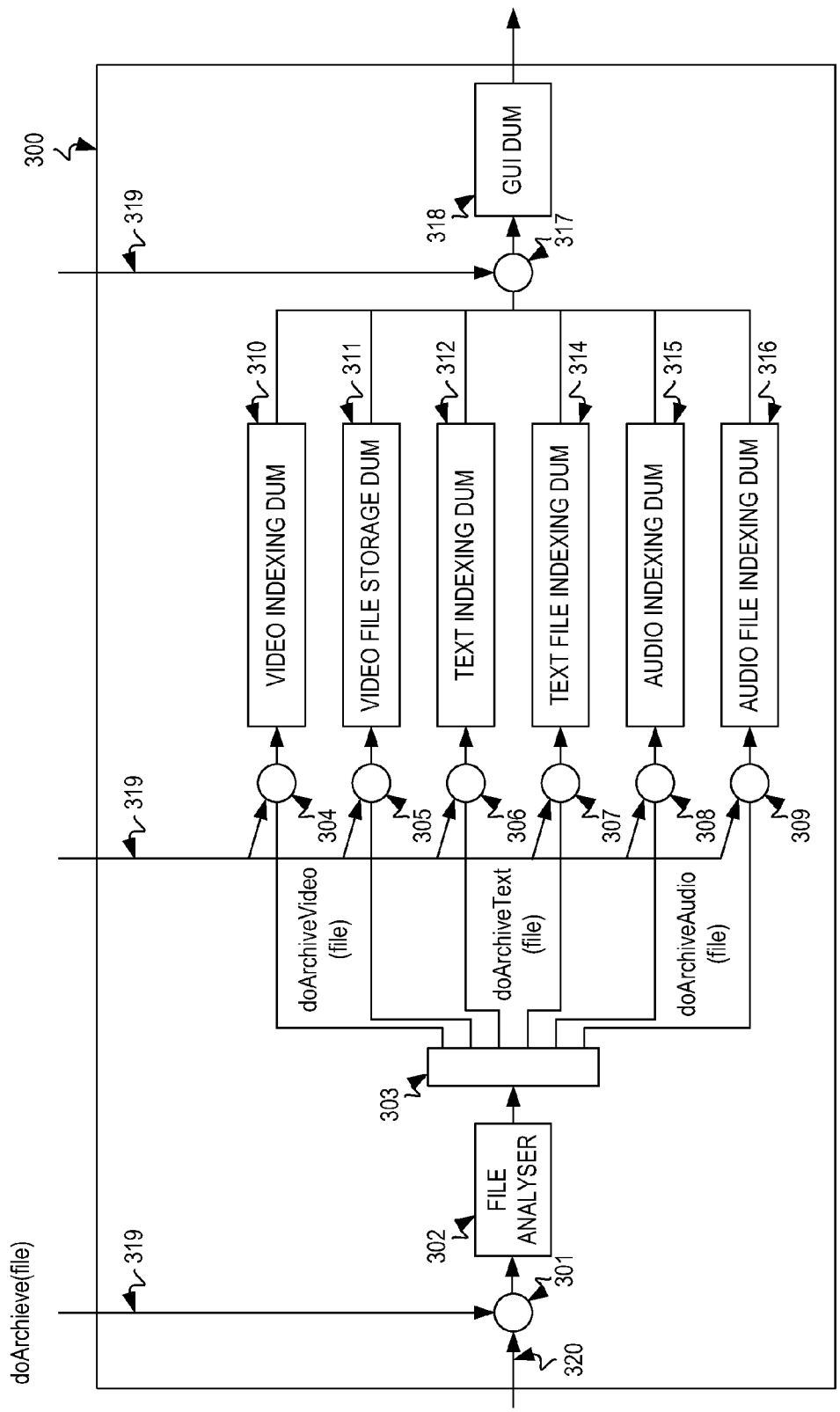
FIG. 3 shows an example of a possible model structure.

FIG. 3 shows an example of a possible model structure. In particular, FIG. 3 represents a particular exemplary asset management application for digital storage and the loading of one of the supported multi-media files into the system.

In this example the way the model is split is a design choice. An application model could range from the simplest model that is one deployment unit representing the whole application to a very detailed network of deployment units each representing a small group of application activities. The size of the model is a design choice that is related to the desired granularity and accuracy of the resulting simulation.

In this example the indexing module is the component in charge of separating the textual part (e.g. individual words) from the media that is the object of the archiving, while the file storage is in charge of archiving the raw data that make up the media (storage software might differ for text, video and audio given they have different average weights). In case of text data the task is easier and is for example a "tokeniser" that is a software procedure that separates the various words and then create an index of such.

In case of an audio media the task could be accomplished by extracting the text portion, if available, from media meta-data, e.g. the lyrics or author or publisher, or in case of recorded voice media the text could be extracted by a speech recognizer.

In case of a video media the task could be accomplished by first extracting the possibly present meta-data, then possibly applying the speech recognizer to the audio track, then applying sophisticated video classification that creates text comments from frame based analysis ('sky'. 'clouds', 'text', 'dark scene', 'commercial' etc).

From a resource perspective, there is an increasing complexity from text, audio, video for both the indexing and storage modules.

As shown, the model 300 is represented by the graph of interconnected Deployment Units 302, 310, 311, 312, 314, 315, 316, 318 corresponding to different functional parts, services or modules of the application. These interrelations and the content of each deployment unit may be described by an XML artifact.

As shown, deployment units 302 corresponds to a File Analyzer Module which in the present example determines whether an input file contains video, text or audio data. Deployment unit 302 feeds workload data to deployment units 310, 311, 312, 314, 315 and 316, via splitter 303. Deployment unit 310 concerns Video indexing, deployment unit 311 concerns video file storage, deployment unit 312 concerns Text indexing, deployment unit 314 concerns Text file storage and deployment unit 315 concerns Audio indexing, and deployment unit 316 concerns Audio file storage. Deployment units 310, 311, 312, 314, 315 and 316 all feed workload data to deployment unit 318 which corresponds to a module modeling resource requirements associated with the application GUI, reflecting the results of the activities of deployment unit 310, 311, 312, 314, 315 and 316. In this particular example there are provided two types of deployment units, reflecting corresponding modules in the application. Specifically, indexing modules are in charge of separating the textual part (e.g. individual words) from the medium that is the object of the archiving, while the file storage module is in charge of archiving the raw data that make up the medium (storage software might differ for text, video and audio given they different average weights). In the case of text data the task is easier and is for example a "tokeniser" that separates the various words and then create an index of such.

In case of an audio media the task could be accomplished by extracting the text from (possibly) media meta-data, e.g. the lyrics or author or publisher, or in case of recorded voice media the text could be extracted by a speech recognizer.

In case of a video media the task could be accomplished by first extracting the (possibly present) meta-data, then possibly applying the speech recognizer to the audio track, then applying sophisticated video classification that creates text comments from frame based analysis ('sky', 'clouds', 'text', 'dark scene', 'commercial' etc).

From a resource perspective, there is an increasing complexity from text, audio, video for both the indexing and storage modules.

Elements 301, 304, 305, 306, 307, 308, 309 and 317 represent workload measurements 319 obtained from monitoring the invocation of the functional part of the application to which the deployment unit for which they are input relates, at runtime.

The initial source is the number and type of invocations of the doArchive action of the real application (e.g. from a web front end), this is information is given as input 320 to the module corresponding to deployment unit 302 that is the first component of the application that is modeled from a resource consumption perspective, that is from the distribution of the input (i.e. number of invocations of the doArchive interface) it will contain the models (i.e. a set of bi-dimensional spaces each with the x-axis as number of doArchive invocations, Y-axis respectively one for RAM, CPU, DISK, etc)

For example each time one of the "video" loading is simulated the execution enter the video path and the Video Indexing Module and Video Storage Module boxes are queried to give the resource consumption model spaces that represents their real counterparts (in this case the X-axis of the model is the number of invocations of the doArchive Video in the real application).

Then there is a common box that is an application component that has the same cost (user notification, e.g. message on a web page) for each file type so every path converge to that box that will have the model spaces of this specific component (X-axis is the invocation of a corresponding "doNotify" for example)

The type of distribution and its parameters can be dynamically modified (in the meaning of "selected") according to actual values from monitoring results to make finer and finer predictions.

The actual probabilistic function, given the simulated input (from both monitoring and simulation) produces the computed resource consumption forecast that can be used by the hosting environment for autonomic feedback actions.

Although in an ideal case a good modeling could be sufficient to describe an application at least for our purposes, in a real case is often difficult to forecast the behavior of an application because of the difficult runtime conditions and changing workload.

So the Parameters P described above (the parameters of the Gaussian distributions for one side, the piece-samples in the other) are periodically compared with measurements from the runtime monitoring, the comparison could be done with a programmatically set cycle-time, even set differently for each component or measurement point as required and specified in the model.

Accordingly at a certain moment if the simulator reads from monitoring that when the is a certain interface hit per minute the average/variance workload is not 100/8.5 but 105/10.2 then the model is adjusted from that moment onwards.

This is the link from the stochastic part and the monitoring/measured part. The simulator can proceed to simulate workload on its own if measurement from monitoring is not available or not possible or not required (if for example the outcome of the model represent the real consumption with high fidelity)

Figure 4:
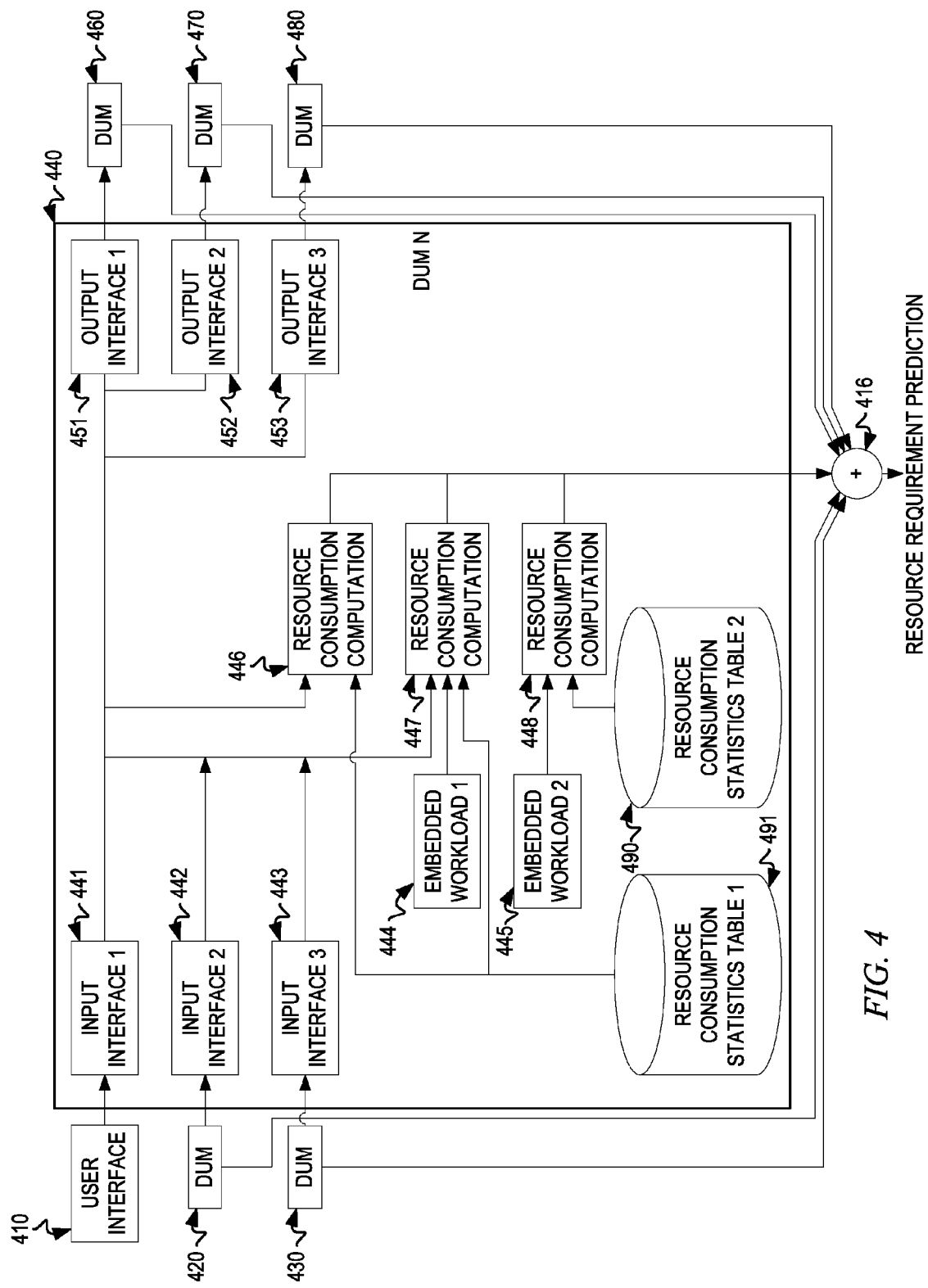
FIG. 4 shows an example of a possible deployment unit structure.

FIG. 4 shows an example of a possible deployment unit structure. As shown, the deployment unit 440 incorporates a number of input interfaces 441, 442, 443 that receive input from other deployment units 420, 430 or external systems or sources of work load such as user input 410. The payload transferred on these interfaces is a representation of the workload, preferably in stochastic terms, which may be simulated or measured.

The deployment unit 440 further incorporates a set of embedded generators of internal workload 444, 445, such as timers. Embedded generators are necessary to account for possible sources of consumption of computing resources in case there are not external activation of interfaces. Examples, if a server that is implemented as an endless loop that allocates every minutes 1 MByte of memory and for some reason is does not release it. The embedded generator (in this case a time uniform generator with period=1 minute) will allow the modeling of the measured memory leak.

The deployment unit 440 further comprises a set of Resource Component Computation components 446, 447, 448, responsible to account the resource consumed by the invocation of a certain interface, they can be one to one to each interface or different interfaces could share the same computation of consumed resources.

For our purpose a resource consumption model of an application is an abstraction of the application for the purpose of providing the amount of computing resources consumed by the application during its execution over a certain runtime environment. It is made up by the models of Deployment Units and their relationships.

FIG. 4 further incorporates Resource consumption statistics tables 491, 490, containing ranked lists of consumed resources specific for that deployment unit and then with the flexibility to vary across interfaces invoked, defined in terms of piece-wise linear function representation as populated for example in step 250 of FIG. 2 as described above.

The statistic tables build upon the concept of consumed resources taxonomy that is preferably specified by the resource consumption model. There are already industry standards describing application performance metrics, for example the set of resources in the Windows Management Instrumentation or WebSphere Performance Monitoring Infrastructure Interface and many others.

In a real implementation it is important that the taxonomy used is one supported by a Monitoring product for the runtime infrastructure so that is possible to evaluate both the quality of the simulation and the evolution of the simulation.

Once the taxonomies are defined in the model, in a certain application deployment unit in the model there will be a set of tables showing a ranked list of the 'top N' resources consumed by that component when a certain interface is invoked.

For example, if the interface is 'Index audio data' the ranked list of the first 3 most important resources consumed could be in a naive taxonomy CPU-disk-memory:

Deployment Unit Statistical Tables:

| INTERFACE | RESOURCES | WORKLOAD |
|---|---|---|
| Index Audio Data Interface1 | Index Audio Interface1 | W100 |
| ... | ... | |
| ... | ... | |

One example of the parametric representation of a certain stochastic modeling of the workload for Index Audio Data Interface 1 could be:
NAME=W100  FAMILY=PARAMETRIC TYPE=GAUSSIAN PARAMETERS=4
PARAMETER=offset VALUE=5.1
PARAMETER=magnitude VALUE=6.5
PARAMETER=average VALUE=100
PARAMETER=variance VALUE=8.5

Content of Index audio Interface 1 child table:

| Resource | Consumption curve |
|---|---|
| CPU Cycles | NP100 |
| Disk Storage | NP101 |
| Memory | NP102 |

Where the 'Consumption curve' name is the key in a (possibly) large list of models that also defined in the 'Resource Consumption Model' file artifact that contains points of a piece-wise function representing the linearized relationship between number of invocations and resulting consumed resources:
NAME=NP100  FAMILY=NONPARAMETRIC TYPE=PIECEWISE SAMPLES=100
AXIS=2
AXIS X=LINEAR
AXIS Y=LINEAR
SAMPLE X=10, Y=8.1
SAMPLE X=20, Y=8.6
SAMPLE X=30, Y=8.9
SAMPLE X=40, Y=9.1
. . .
SAMPLE X=10000, Y=20.1

In the example the statistical workload W100 and the resource consumption function NP100 provide as output an amount of 'what' is consumed based of the workload in input.

In the second example when the interface with which the table is associated is hit 20 times/minute the modeled component will consume 8.6 Disk Storage units. If X(*)=25, an intermediate workload is placed or measured in input, an interpolation of the table will allow to estimate the consumption.

Instead of a very complex modeling of the application and its component the proposed framework provides very simple basic models and let the complexity of the overall application consumption emerge by the non linear combination of the models.

While as shown each deployment unit incorporates a number of individual tables, these may be combined as a single large table per deployment unit, or indeed one or more tables shared between a number of deployment units. Tables may also be reused for example to reflect use by the application of libraries—the table for a particular library need not be generated for each case of use of that library, but rather a shared table could be reused for each link to the library.

The deployment unit 440 further incorporates output interface blocks 451, 452, 453, which can be connected to other components of the model.

The output interface blocks 451, 452, 453, each describe a workload that is sent to a certain output e.g. another deployment unit as a function of an input workload value, hence the dependency could be to link the values of the parameters of the consumer block to the parameters of the interface block.

Interface 1 will be invoked with a workload 20 times/minute the WORKLOAD being of type GAUSSIAN, magnitude=1, average=10.5, variance=8, offset=0 (the list of information is the vector P (i1) for Interface 1)
. . .
Interface 3 will be hit invoked a workload 20 times/minute the WORKLOAD being UNIFORM, magnitude=1, average=25 (the list of information is P (i3) the vector P for Interface 3)

Output interface 1 may perform the following calculation for example:

Output interface 1 will produce versus the output were it could be connected a WORKLOAD of type TYPE(Interface 1)+TYPE(Interface 3), average=average(Interface 1)+0.5*average(Interface 3)

So the with the dotted line connecting the input interfaces with the output interfaces indicates that each output interface can access the values from Interfaces and dynamically build the output workload values. Thus each deployment unit may be seen as a filtering of workload traffic.

Thus each unit models workload as well as resource requirement data, and each model receives workload data as its input, and outputs workload data to succeeding units.

In other words, each output interface functionally links the workload parameter P of the input interface programmatically to produce the corresponding output value, based on the fact that during a simulation is it possible to represent with good fidelity the stochastic parameters of the workload originated by the consumer, which may be represented by the simulated vector W*. The workload at any output can also be provided by monitoring of the application at runtime, this will be the W.

A certain application component is (possibly) invoked by peers and (possibly) invokes peers, hence the outputs are only a list of embedded 'clients' that connect the box to the other boxes. Each individual output can be possibly associated with workload description as a function of the workload in the input side of the component.

In the example of FIG. 3, the component Video indexing deployment unit 304 is called by component File analyser deployment unit 302 and the component Video indexing deployment unit 304 calls in turn GUI deployment unit 318. The output inside the Video indexing deployment unit 304 can be modeled as a workload generator with parameters functionally related (e.g. a weighted sum) of the workload in input on the component.

If a deployment unit represents a component that consumes resources without generating output to other components will not have the 'consumers' part invoking other components but only the input and tables part.

The Resource consumption outputs from all deployment units are aggregated as reflected schematically by the element 416 to obtain a final instantaneous resource requirement prediction.

As shown, Input interface 441 receives workload data from the user interface 410, Input interface 442 receives workload data from deployment unit 420, Input interface 443 receives workload data from deployment unit 430, Output interface 451 outputs workload data to deployment unit 460, Output interface 452 outputs workload data to deployment unit 470, and Output interface 453 outputs workload data to deployment unit 480. As shown, Resource Consumption computation 446 receives input from Input interface 1 (441) and Resource consumption table 1 (491). Resource Consumption computation 447 receives input from Input interfaces 2 (442) and 3 (443), embedded workload 1 (444) and Resource consumption table 1 (491). Resource Consumption computation 448 receives input from embedded workload 2 (445) and Resource consumption table 2 (490).

Figure 5A:
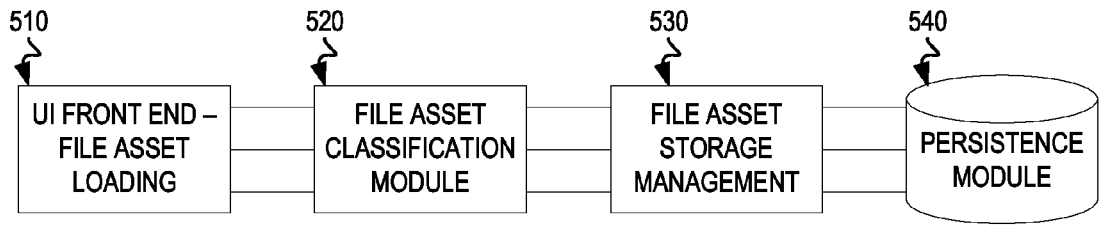
FIG. 5a shows the functional architecture of a sample application to store digital asset.
Figure 5B:
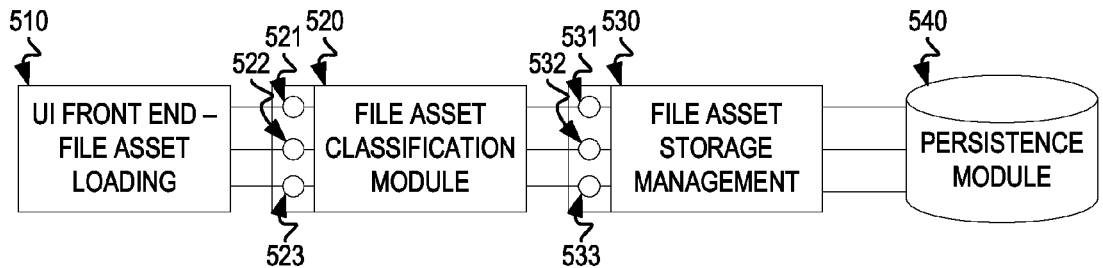
Figure 5C:
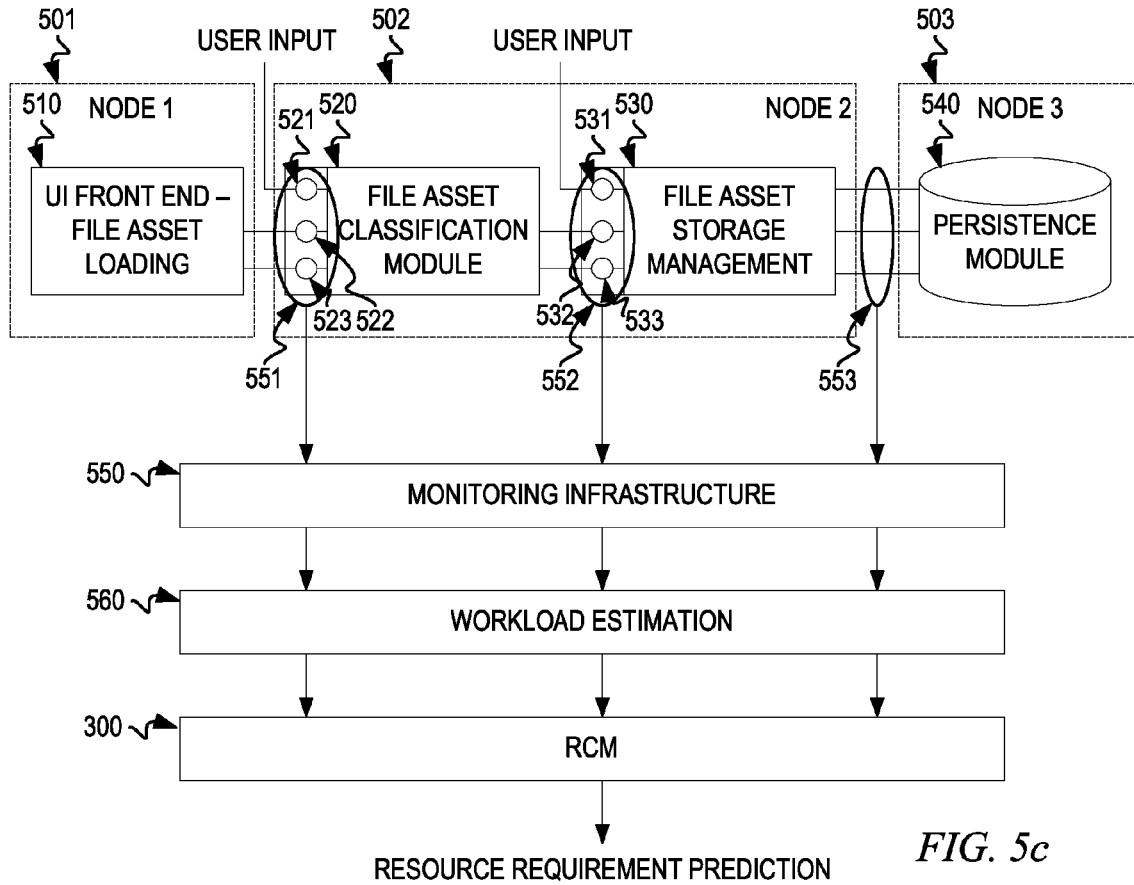
FIG. 5c shows a typical situation where a functional architecture is implemented in a concrete scenario.

FIGS. 5a to 5c develop the association of the exemplary model of FIG. 3 to the underlying application.

FIG. 5a shows the functional architecture of a sample application to store digital asset (computer files), the task was split into three components with responsibilities of accepting from user the file, classify the type of file, store it. As shown, the application comprises a user interface front end 510 which is used to load a file asset, a file asset classification module 520 which identifies the type of file to be loaded, a file asset storage module 530, and a persistence module 540. It will be understood that the file asset classification module 520 corresponds generally to the file analyser deployment unit 302 of FIG. 3, the file asset storage module 530 corresponds generally to the combined functions of the deployment units 310, 311, 312, 314, 315 and 316 of FIG. 3.

FIG. 5b shows some details of functional architecture of FIG. 5a where some Interfaces (IF) of the components are exploded and so the communication bus across components so that one can explicitly see that components communicates with some interface invocations. In particular, FIG. 5b shows interfaces 521, 522 and 523 of module 520 and interfaces 531, 532 and 533 of module 530.

FIG. 5c shows a typical situation where a functional architecture is implemented in a concrete scenario. So new components are identified and separated according to the node where they should run. In this particularly example all the system will be implemented with Java Enterprise Edition components, but in general one can have a mixture of components. In this particular example each functional component will run on a separate physical node, except the classification servlet and asset management server that will hosted on the same node (a Java Application Server). In particular, as shown module runs in a first node 501, modules 520 and 530 run in a second node 502 and the persistence module 540 runs in a third node 503.

At this point on the physical architecture probes 551, 552, 553 are set that will listen to the chosen listening points 521, 522 and 523 of module 520 and interfaces 531, 532 and 533 of module 530 respectively in the communication buses according to the maps specified in the Resource Consumption Model of that application delivered with the Application as a behavioral model. As shown, the workload information gathered via probes 551, 552, 553 is relayed to the RCM via the monitoring infrastructure 550.

As shown, there is provided a workload estimation module 560, between the Monitoring infrastructure 550 and the RCM 300. While the probes 551, 552, 553 provide occasional information about the workload to which the system is exposed, the RCM 300 requires, at least in certain embodiments, continuous workload information. The workload estimation module 560 either forwards fresh instantaneous data to the RCM 300, or where this is unavailable provides estimated values based on statistical information gathered over time from information passed over the monitoring infrastructure as described in more detail with respect to FIG. 7 hereafter.

Figure 6:
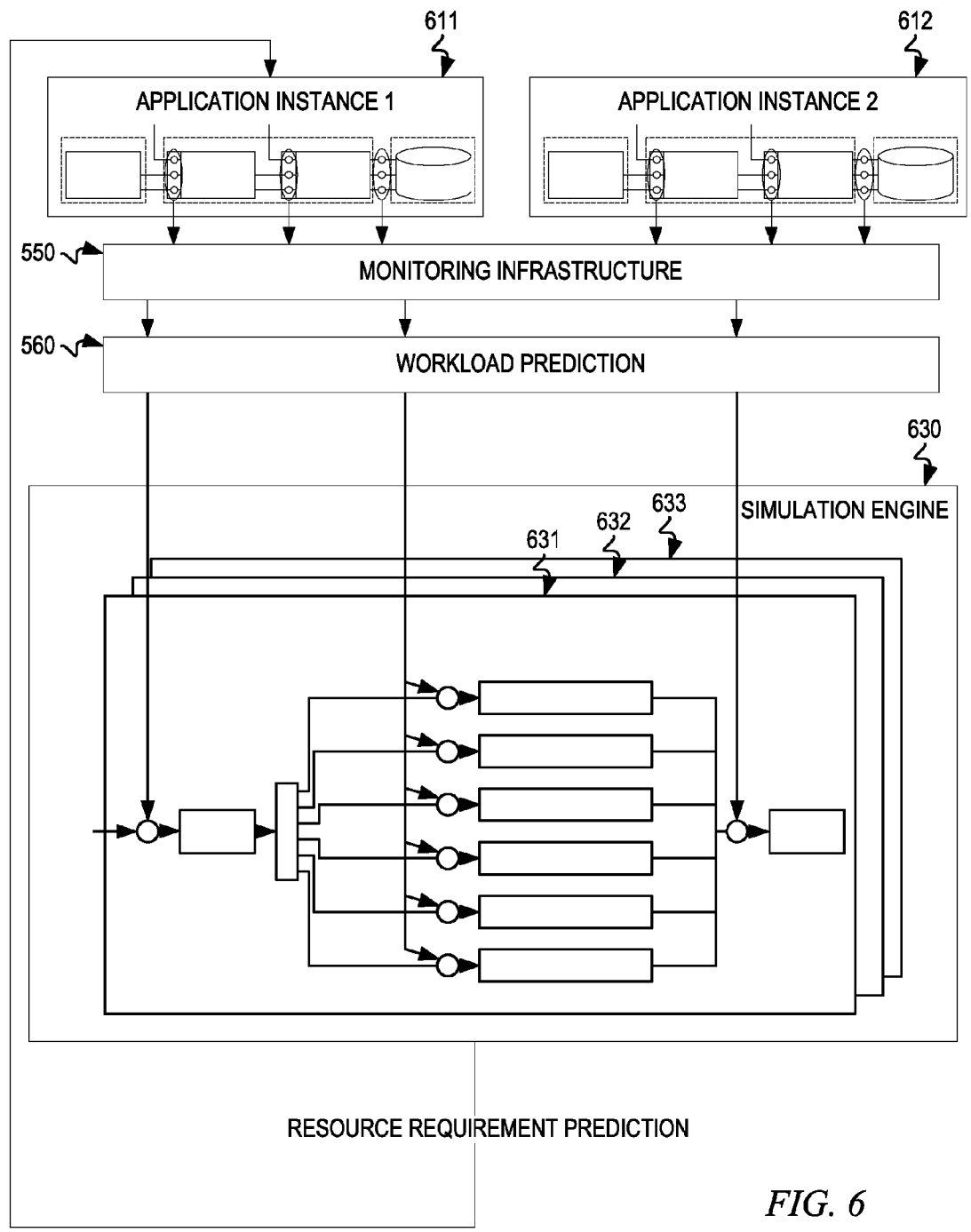
FIG. 6 shows a diagram of the resource prediction system architecture with two instances of the same application running possibly on completely different runtime platforms.

FIG. 6 shows a diagram of the resource prediction system architecture with two instances 611 and 612 of the same application running possibly on completely different runtime platforms. The Simulation Engine 630 takes the Resource Consumption Model of the application in question and starts interpreting the model feeding it with the values received by the monitoring probes via the monitoring infrastructure 550.

The simulation engine 630 hosts a unique model for the application, but maintains a separate instance 631, 632, 633 in parallel for each separate instance of the application each one with their current status (input and output) according to the monitoring input received from the two separate instances of the Application on the system (or systems). Typically the application runs in hypervisor environment systems.

The simulation engine 630 can run multiple models, also from different applications (not shown in figure), since its core functionality is an application-agnostic graph interpreter where the graph needs to adhere to certain specification.

Figure 7:
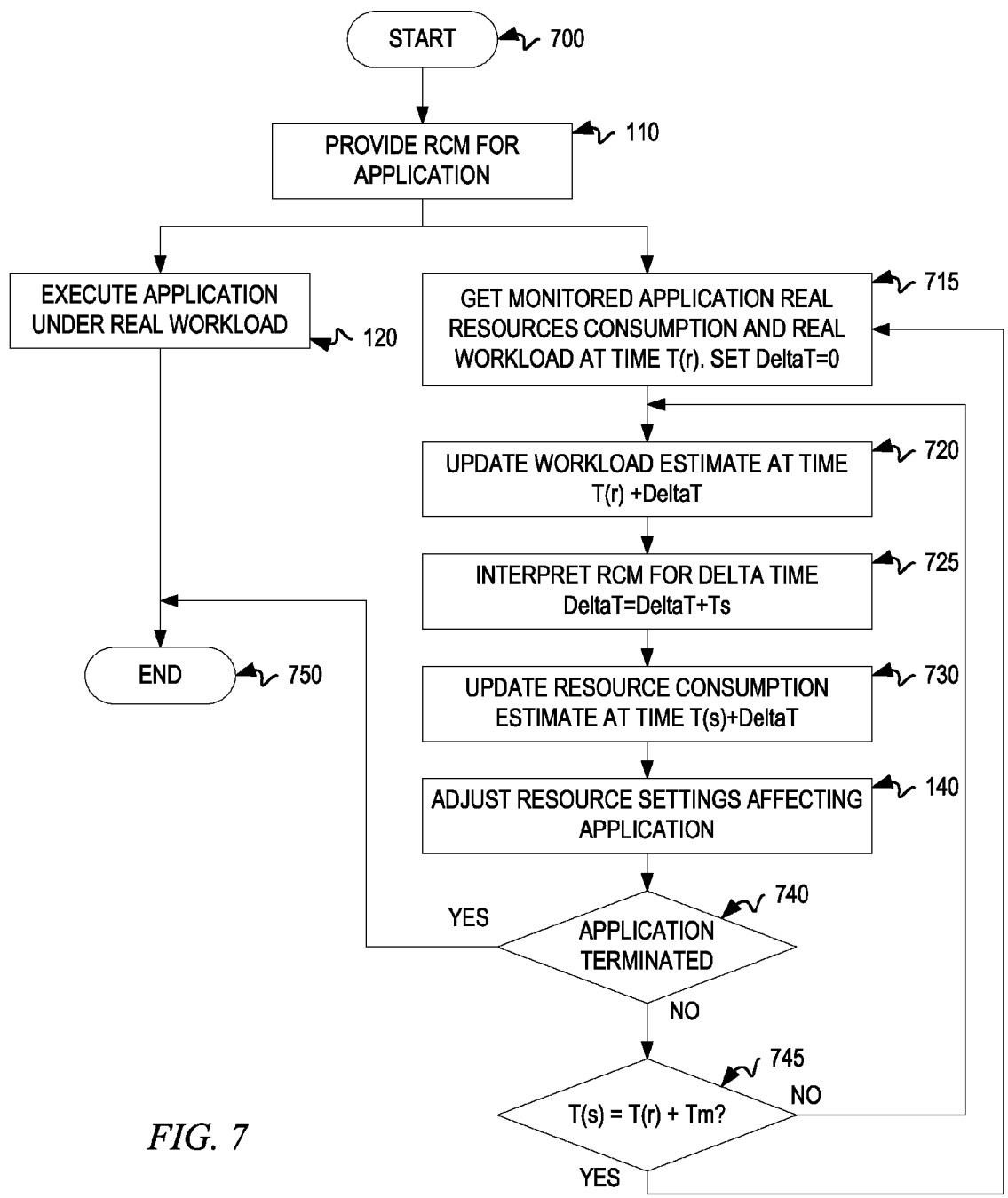
FIG. 7 shows an exemplary algorithm representing the role of the workload estimation module in the operation of certain embodiments.

FIG. 7 shows an exemplary algorithm representing the role of the workload estimation module in the operation of certain embodiments.

As mentioned above, while the probes monitoring the application can provide occasional information about the workload to which the system is exposed, the RCM requires, at least in certain embodiments, continuous workload information. The Workload estimation module either forwards fresh instantaneous data to the RCM, or where this is unavailable provides estimated values based on statistical information gathered over time from information passed over the monitoring infrastructure. Without this process the prediction could not take place as described because the simulated workload is constant or varies only when originating from the DUMs. Instead it is advantageous to introduce a workload estimation process for each external input of the system generating workload that will be used in the RCM during each simulation interval in which there are no workload updates from the real application through monitoring as in the case of resource consumption measurement.

The workload estimation component handles the task of predicting the future value of the workload during the interval in which the readings from monitoring are not yet available, and also for another reason: we said the simulator is able to predict the resource consumption of the application at a future time, current time in which the application is running that is T(r) the time of the runtime resource consumption.

Time T(s) is the time of the simulated resource consumption—T(s) is the future with respect to T(r).

As shown in FIG. 7, the method starts with steps 110 of providing the RCM and 120 of executing the application as described with respect to FIG. 1 or 2 above. Meanwhile, in parallel with step 120 the workload estimation component proceeds to read in input the real measurement of the workload at time T(r) from probe points at step 715.

The method next proceeds to step 720 at which the workload estimate is updated for a time T(r)+deltaT, where deltaT is the elapsed time since T(r). The workload estimate is calculated by apply trends analysis techniques such as a linear regression to the statistical parameters describing the workload according to historical statistical measurement. Considering as an example a Gaussian workload with average H(Tr)= 200 representing workload parameter web page hit per second at time T(r): when re-evaluating the estimate for the interval deltaT the workload estimation component will require the workload at time T(s)=T(r)+deltaT to provide the correct input to the DUM having that workload as input. If deltaT is 1 hour and trend analysis on the historical monitoring has found the average grows by 2 each hour, then the new workload will be extracted from a Gaussian distribution having the H(Ts)=202.

The method next proceeds to step 725, at which the RCM is interpreted for the current T(s).

The method then proceeds to step 730, at which the Resource consumption estimate for the current T(s) is update on the basis of the output of the RCM, before proceeding to step 140 of updating resource settings as described above with respect to FIGS. 1 and 2. From step 140 the method proceeds to step 740 of determining whether the application has terminated. In a case where the application is terminated, the method ends at step 750. Otherwise, the method proceeds to step 745, at which it is determined whether Ts=T(r)+Tm, where Tm is the interval between two monitoring reading updates. If Ts=T(r)+Tm, then fresh monitoring values from real application are available, and the method returns to step 715 at which the new real resource consumption values are used to update and validate the trend analysis component and the resources consumption values (if needed) and to compute the quality measure of the prediction comparing the predicted and real resource consumption values. The method proceeds from step 120 to termination at step 750 at the end of the application.

Figure 8:
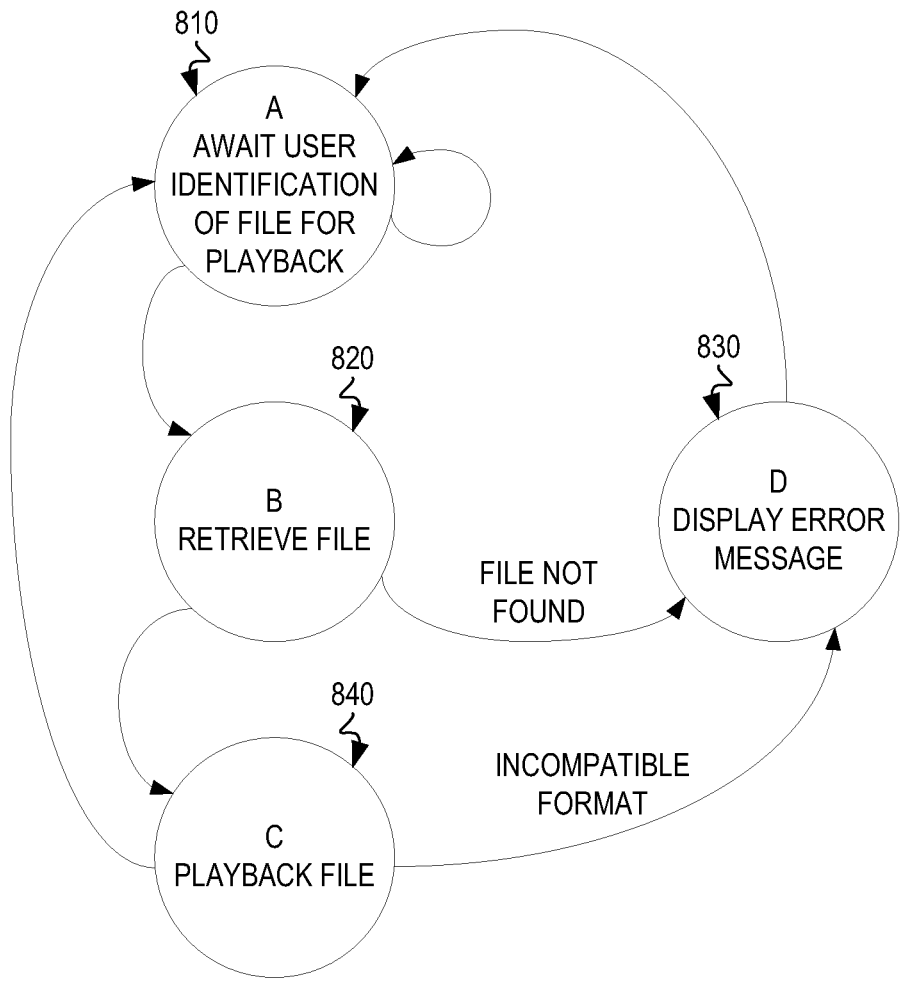
FIG. 8 shows a third embodiment.

FIG. 8 shows a third embodiment. As described above, by interpreting the deployment unit for the module of the application presently under execution more rapidly that the execution of the module itself, it is possible to obtain a resource requirement prediction for the forthcoming requirements of the present module. In accordance with a third embodiment, the model may be used to obtain resource requirement prediction for a time in the future after completion of the present module. As shown in FIG. 8, an application may be represented as a Finite State Machine, with each state corresponding to a deployment unit of the model. On this basis, whatever the present state of the application, and therefore the model, the next possible states may also be determined. Once the deployment unit for the present module has been interpreted as described above, the simulation engine may then proceed to interpret the different possible following deployment units, so as to obtain a resource requirement prediction for the forthcoming activities of the application. Where the FSM indicates several possible future paths, these may be interpreted in serial or in parallel, depending on the capacity of the simulation engine. The a resource requirement prediction for the future state may be taken simply to be the worst case scenario, that is, which ever situation calls for the most system resources, or for each resource, the greatest possible requirement for that resource from any of the possible scenarios. Alternatively, the model may weight the different scenarios so as to select the most probable, or to combine the different requirements of the different scenarios in a manner taking into account the likelihood of each scenario occurring.

As shown in FIG. 8, an exemplary application comprises 4 states 810, 820, 830 and 840. The state A 810 corresponds to a state of awaiting user identification of a file for playback. From this state the application may either proceed to state B 820 or loop back to itself. The state B 820 corresponds to a state of retrieving a file identified by the user for playback. From this state the application may either proceed to state C 840 or D 830. The state C 840 corresponds to a state of playing back a file retrieved at step B 820. From this state the application may either proceed to state D 830 or revert to step A 810. The state D 830 corresponds to a state of displaying an error message to the user, corresponding either to the file requested at step B 820 not being found, or the file played back at step C 840 being of an incompatible format. From this state the application may only proceed to state A 810.

Figure 9:
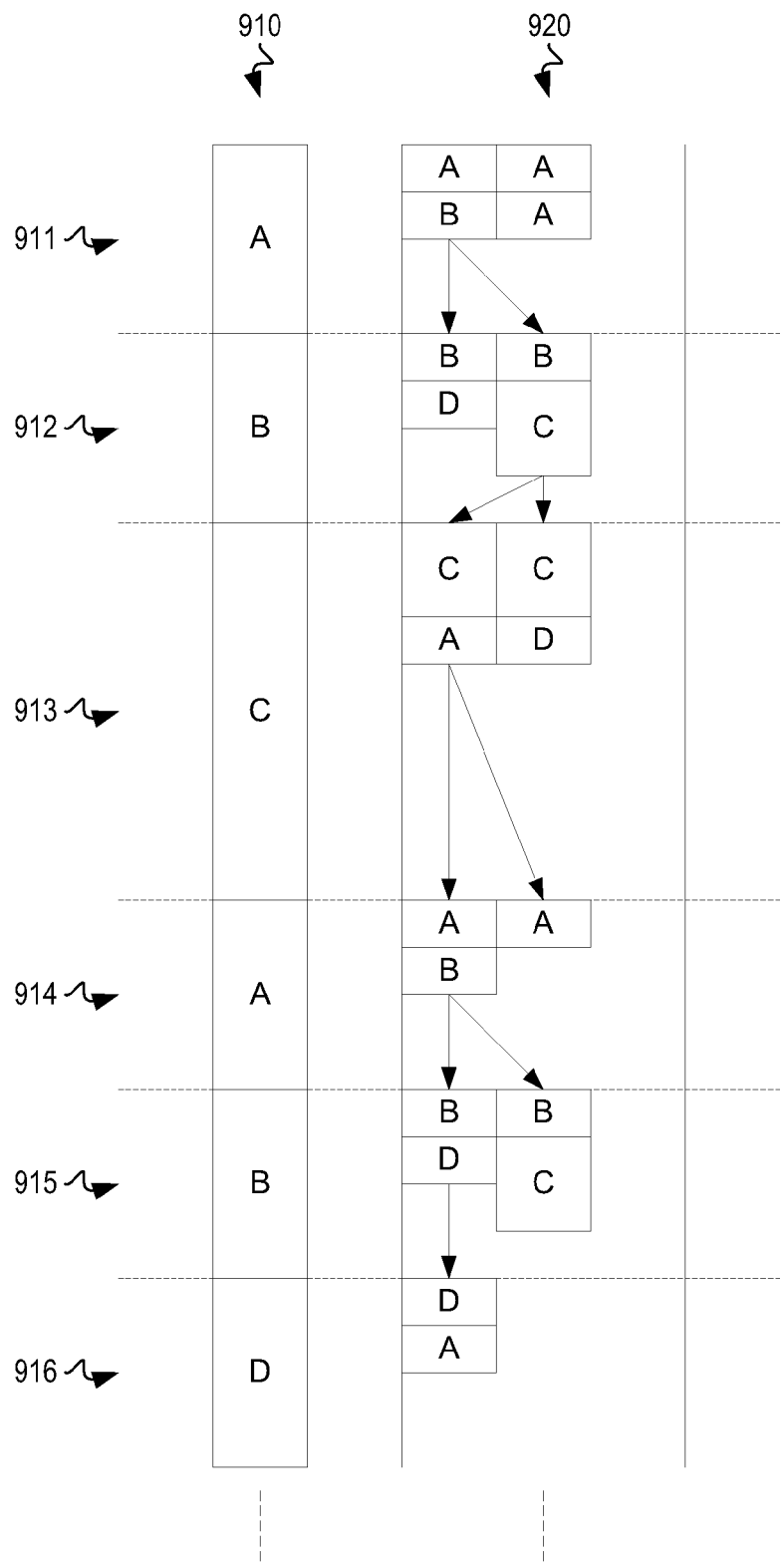
FIG. 9 is a time line representing an exemplary flow of the application through a series of statuses in accordance with the FSM of FIG. 7.

FIG. 9 is a time line representing an exemplary flow of the application through a series of statuses in accordance with the FSM of FIG. 8. In particular the column 910 is a time line representing an exemplary flow of the application through a series of statuses in accordance with the FSM of FIG. 8. As shown, the sequence of statuses is A-B-C-A-B-D. Column 920 meanwhile represents the activity of the simulation engine. As shown, whenever the application enters a new status, the corresponding deployment unit of the model is immediately interpreted as described with regards to the preceding embodiments. Furthermore, once the interpretation of the deployment unit of the current module is complete, the simulation engine proceeds to interpret in parallel each of the modules that might be called next according to the FSM of FIG. 8 depending on non deterministic factors such as user input. Thus as shown in the first phase 911 while the actual state of the application is A, the simulation engine interprets the deployment unit corresponding to the module A, and then proceeds to interpret the deployment unit corresponding to the module B in a first instance and the deployment unit corresponding to the module A in a second instance. As shown the application in fact proceeds to state B. As shown in the second phase 912 while the actual state of the application is B, the simulation engine interprets the deployment unit corresponding to the module B, and then proceeds to interpret the deployment unit corresponding to the module D in a first instance and the deployment unit corresponding to the module C in a second instance. As shown the application in fact proceeds to state C. As shown in the third phase 913 while the actual state of the application is C, the simulation engine interprets the deployment unit corresponding to the module C, and then proceeds to interpret the deployment unit corresponding to the module A in a first instance and the deployment unit corresponding to the module D in a second instance. As shown the application in fact proceeds to state A. As shown in the fourth phase 914 while the actual state of the application is A, the simulation engine interprets the deployment unit corresponding to the module A, and then proceeds to interpret the deployment unit corresponding to the module A in a first instance and the deployment unit corresponding to the module B in a second instance. As shown the application in fact proceeds to state B. As shown in the fifth phase 915 while the actual state of the application is B, the simulation engine interprets the deployment unit corresponding to the module B, and then proceeds to interpret the deployment unit corresponding to the module D in a first instance and the deployment unit corresponding to the module C in a second instance. As shown the application in fact proceeds to state D. As shown in the sixth phase 916 while the actual state of the application is B, the simulation engine interprets the deployment unit corresponding to the module D, and then proceeds to interpret the deployment unit corresponding to the module A, since this is the only state that may come after state D in accordance with FIG. 8. In each case by looking ahead in this way, resource attribution decisions may be made taking into account the likely future requirements of the application.

The skilled person will appreciate that while the third embodiment describes looking forward one step ahead, it would be possible to look forward any number of steps, although the geometric increase of the number of scenarios to be explored will eventually lead to an overhead increase that negates the benefit of resource optimization.

Accordingly, the step of interpreting said resource consumption model may comprise interpreting a series of successive units of the model in less time than that required for the completion of the current functional state of said application corresponding to the first of said series of successive units, so that resource requirement data for future possible application states are available before the application changes state.

Furthermore, interpreting a plurality of alternatives series of successive units of said model may comprise each said alternative series starting with the same unit corresponding to the current functional state of said application, all of said plurality of alternative series being interpreted in less time than that required for the completion of the current functional state of said application corresponding to the first of said series of successive units, so that resource requirement data for future possible application states are available before the application changes state.

Still further, different alternative series may be weighted according to the likelihood that the functional state of the application will develop in the manner represented by the series of units forming that series.

According to further embodiments, a resource consumption model is created for a software application, making it possible to predict the resource requirements of the application in different states. The model has a structure corresponding to that of the application itself, and is interpreted to some degree in parallel with the application, but each part of the model is interpreted in less time than it takes to complete the corresponding part of the application, so that resource requirement predictions are available in advance. The model may be interpreted in a look-ahead mode, wherein different possible branches of the model are interpreted so as to obtain resource requirement predictions for the application after completion of the present step. The model may be derived automatically from the application at design or compilation, and populated by measuring the requirements of the application in response to test scenarios in a controlled environment. The model may take the form of a UML description. The Model may be distributed together with the application itself.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Computer system 1000 comprises a processor 1010, a main memory 1020, a mass storage interface 1030, a display interface 1040, and a network interface 1050. These system components are interconnected through the use of a system bus 1001. Mass storage interface 1030 is used to connect mass storage devices (Hard disk drive 1055) to computer system 1000. One specific type of removable storage coupled to external storage interface 1042 is a floppy disk drive 1062 which may store data to and read data from a Floppy disk 1095, but may other types of computer readable storage medium may be envisaged, such as readable and optionally writable CD ROM drive. There is similarly provided a User input interface 1044 which received user interactions from interface devices such as a mouse 1065 and a keyboard 1064. There is still further provided a printer interface 1046 which may send and optionally receive signals to and from a printer 1066.

Main memory 1020 in accordance with the preferred embodiments contains data 1022, an operating system 1024.

Computer system 1000 utilizes well known virtual addressing mechanisms that allow the programs of computer system 1000 to behave as if they only have access to a large, single storage entity instead of access to multiple, smaller storage entities such as main memory 100 and HDD 1055. Therefore, while data 1022, operating system 1024, are shown to reside in main memory 1020, those skilled in the art will recognize that these items are not necessarily all completely contained in main memory 1020 at the same time. It should also be noted that the term "memory" is used herein to generically refer to the entire virtual memory of computer system 1000.

Data 1022 represents any data that serves as input to or output from any program in computer system 1000. Operating system 1024 is a multitasking operating system known in the industry as OS/400; however, those skilled in the art will appreciate that the spirit and scope of the present invention is not limited to any one operating system.

Processor 1010 may be constructed from one or more microprocessors and/or integrated circuits. Processor 1010 executes program instructions stored in main memory 1020. Main memory 1020 stores programs and data that processor 1010 may access. When computer system 1000 starts up, processor 1010 initially executes the program instructions that make up operating system 1024. Operating system 1024 is a sophisticated program that manages the resources of computer system 1000. Some of these resources are processor 1010, main memory 1020, mass storage interface 1030, display interface 1040, network interface 1050, and system bus 1001.

Although computer system 1000 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 1010. However, those skilled in the art will appreciate that the present invention applies equally to computer systems that simply use I/O adapters to perform similar functions.

Display interface 1040 is used to directly connect one or more displays 1060 to computer system 1000. These displays 1060, which may be non-intelligent (i.e., dumb) terminals or fully programmable workstations, are used to allow system administrators and users to communicate with computer system 1000. Note, however, that while display interface 1040 is provided to support communication with one or more displays 1060, computer system 1000 does not necessarily require a display 1065, because all needed interaction with users and other processes may occur via network interface 1050.

Figure 10:
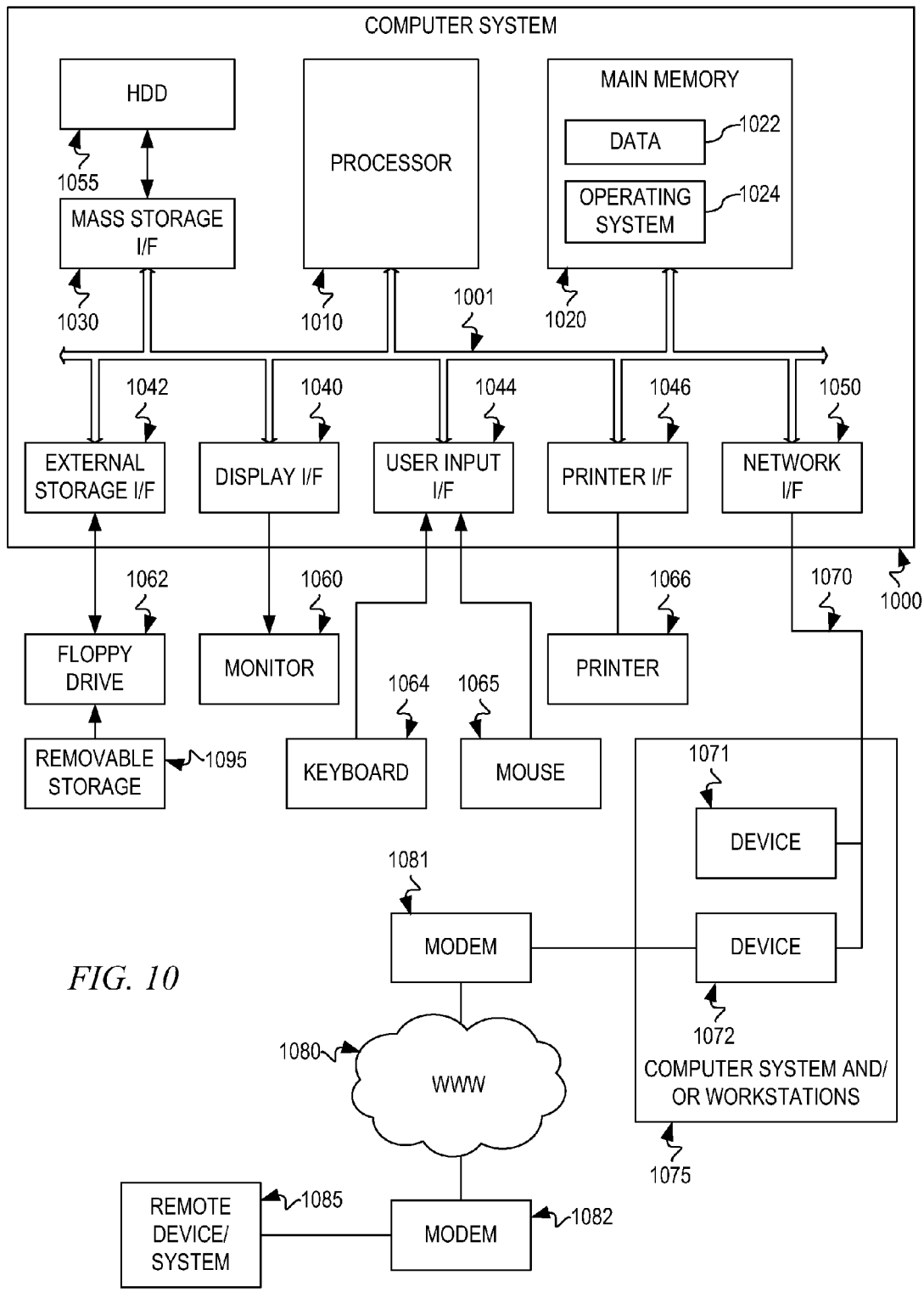
FIG. 10 shows a data processing system suitable for storing and/or executing program code.

Network interface 1050 is used to connect other computer systems and/or workstations (e.g., 1075 in FIG. 10) to computer system 1000 across a network 1070. The present invention applies equally no matter how computer system 1000 may be connected to other computer systems and/or workstations, regardless of whether the network connection 1070 is made using present-day analogue and/or digital techniques or via some networking mechanism of the future. In addition, many different network protocols can be used to implement a network. These protocols are specialized computer programs that allow computers to communicate across network 1070. TCP/IP (Transmission Control Protocol/Internet Protocol) is an example of a suitable network protocol, for example over an Ethernet network. As shown, the network 1070 connects the system 1000 to two further devices 1071 and 1072, which may be other computer systems similar to that described above, or other network capable devices such as printers, routers etc. In the present example, network device 1072 is a 1c1 server, which is connected via a modem 1081 to a public network 1080 such as the word wide web. By means of this public network 1080 a connection to a remote device or system 1085 may be established via modem 1082.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 1095 of FIG. 10), and transmission type media such as digital and analogue communications links.

The invention claimed is:

1. An apparatus comprising:
 a processor;
 a memory coupled to the processor, wherein the memory comprises instructions which, when executed by the processor, cause the processor to:
 provide a resource consumption model of an application, the resource consumption model being adapted to provide resource requirements of the application as a function of a current functional state of the application;
 execute the application; and
 in parallel with the execution of the application:
  interpret the resource consumption model in conjunction with the current functional state of the application to generate resource requirement data for the application,
  interpret a series of successive units of the resource consumption model in less time than that required for the completion of the current functional state of the application corresponding to a first of the series of successive units and a plurality of alternative series of successive units of the resource consumption model, each alternative series of the plurality of alternative series starting with the same unit corresponding to the current functional state of the application, all of the plurality of alternative series being interpreted in less time than that required for the completion of the current functional state of the application corresponding to the first of the series of successive units, so that resource requirement data of the series of successive units and each of the plurality of alternative series of successive units for future possible application states are available before the application changes state, wherein different alternative series of the plurality of alternative series are weighted according to the likelihood that the functional state of the application will develop in the manner represented by the series of units forming that series, and
  adjust system resource settings affecting the application as a function of the resource requirement data of the series of successive units and each of the plurality of alternative series of successive units before the application changes state based on a worst case of the future possible application states.

2. The apparatus of claim 1, wherein the instructions to interpret and adjust are repeated iteratively as the state of the application evolves.

3. The apparatus of claim 1, wherein the instructions, prior to providing the resource consumption model of the application, further cause the processor to:
 execute the application in a test environment so as to pass through a plurality of status conditions;
 measure resource requirements of the application under the plurality of status conditions; and
 populate the resource consumption model on the basis of the measured resource requirements.

4. The apparatus of claim 3, wherein a structure of the resource consumption model mirrors that of the application, and comprises a plurality of units, each unit in the plurality of units corresponding to a particular combination of application status conditions correspond to functional states of the application, and wherein the instructions to populate the resource consumption model on the basis of the measured resource requirements further cause the processor to associate one or more predefined statistical performance metrics with each functional state.

5. The apparatus of claim 4, wherein the structure of the resource consumption model is derived from a formal description of the application, or from the source code of the application itself.

6. The apparatus of claim 4, wherein each unit in the plurality of units models workload as well as the resource requirement data, and each unit receives workload data as its input and outputs workload data to succeeding units in the plurality of units.

7. The apparatus of claim 6, wherein one or more interfaces of the application are monitored so as to determine application workload levels, and wherein workload values in the plurality of units are updated to reflect these measured values when available.

8. The apparatus of claim 1, wherein in interpreting the resource consumption model, the interpretation of a unit of the model is completed in less time than that required for the completion of the corresponding functional state of the application, so that the resource requirement data are available before the application changes state.

9. A computer program product comprising a non-transitory computer readable storage medium having a computer readable program stored therein, wherein the computer readable program, when executed on a computing device, causes the computing device to:
 provide a resource consumption model of an application, the resource consumption model being adapted to provide resource requirements of the application as a function of a current functional state of the application;
 execute the application; and
 in parallel with the execution of the application:
  interpret the resource consumption model in conjunction with the current functional state of the application to generate resource requirement data for the application,
  interpret a series of successive units of the resource consumption model in less time than that required for the completion of the current functional state of the application corresponding to a first of the series of successive units and a plurality of alternative series of successive units of the resource consumption model, each alternative series of the plurality of alternative series starting with the same unit corresponding to the current functional state of the application, all of the plurality of alternative series being interpreted in less time than that required for the completion of the current functional state of the application corresponding to the first of the series of successive units, so that resource requirement data of the series of successive units and each of the plurality of alternative series of successive units for future possible application states are available before the application changes state, wherein different alternative series of the plurality of alternative series are weighted according to the likelihood that the functional state of the application will develop in the manner represented by the series of units forming that series, and adjust system resource settings affecting the application as a function of the resource requirement data of the series of successive units and each of the plurality of alternative series of successive units before the application changes state based on a worst case of the future possible application states.

10. The computer program product of claim 9, wherein the computer readable program to interpret and adjust are repeated iteratively as the state of the application evolves.

11. The computer program product of claim 9, wherein the computer readable program, prior to providing the resource consumption model of the application, further cause the computing device to:

execute the application in a test environment so as to pass through a plurality of status conditions;

measure resource requirements of the application under the plurality of status conditions; and populate the resource consumption model on the basis of the measured resource requirements.

12. The computer program product of claim 11, wherein a structure of the resource consumption model mirrors that of the application, and comprises a plurality of units, each unit in the plurality of units corresponding to a particular combination of application status conditions correspond to functional states of the application, and wherein the computer readable program to populate the resource consumption model on the basis of the measured resource requirements further cause the computing device to associate one or more predefined statistical performance metrics with each functional state.

13. The computer program product of claim 12, wherein the structure of the resource consumption model is derived from a formal description of the application, or from the source code of the application itself.

14. The computer program product of claim 12, wherein each unit in the plurality of units models workload as well as the resource requirement data, and each unit receives workload data as its input and outputs workload data to succeeding units in the plurality of units.

15. The computer program product of claim 14, wherein one or more interfaces of the application are monitored so as to determine application workload levels, and wherein workload values in the plurality of units are updated to reflect these measured values when available.

16. The computer program product of claim 9, wherein in interpreting the resource consumption model, the interpretation of a unit of the model is completed in less time than that required for the completion of the corresponding functional state of the application, so that the resource requirement data are available before the application changes state

* * * * *